Jan. 21, 1969 H. SCHOLL 3,423,604

MONOSTABLE MULTIVIBRATOR FOR PRODUCING PULSE OF LONG DURATION

Filed July 6, 1965 Sheet 1 of 2

INVENTOR
Hermann Scholl by Michael J. Striker
Attorney

INVENTOR
Hermann Scholl by Michael J. Striker
Attorney

United States Patent Office 3,423,604

Patented Jan. 21, 1969

3,423,604

MONOSTABLE MULTIVIBRATOR FOR PRODUCING PULSE OF LONG DURATION

Hermann Scholl, Stuttgart, Germany, assignor to Robert Bosch, G.m.b.H., Stuttgart, Germany Filed July 6, 1965, Ser. No. 469,751

Claims priority, application Germany, July 10, 1964, B 77,612

U.S. Cl. 307—273 8 Claims

Int. Cl. H03k *3/26*

ABSTRACT OF THE DISCLOSURE

A monostable multivibrator for producing pulses including input and output transistors connected to each other, inductively regenerative means coupling the output transistor to the input transistor, and a pulse duration lengthening circuit connected in parallel with the inductively regenerative means.

The present invention relates to a monostable multivibrator for producing a pulse of long duration. More particularly, the invention relates to an inductively regenerative transistor monostable multivibrator in which the duration of the output pulse is lengthened by variation of the inductivity of the regenerative circuit.

In electronic control circuits, in which a pulse length is to be controlled, it is frequently necessary to vary the pulse length in dependence upon several influencing values, factors or parameters. In a monostable multivibrator, which is inductively regenerative, the pulse duration is usually controlled by mechanical variation of the magnetic circuit of the transformer of the regenerative circuit. The pulse duration is usually lengthened, under additional control, by an additional movable armature which is moved in accordance with another influencing value, factor or parameter. In such a case, the disadvantage of the necessity for an additional transformer arises when the additional influencing value or factor is not sufficient to provide a mechanical movement.

The principal object of the present invention is to provide a new and improved monostable multivibrator.

An object of the present invention is to provide a new and improved monostable multivibrator for producing a pulse for long duration.

Another object of the present invention is to provide a monostable multivibrator which avoids the disadvantage of requiring an additional transformer to lengthen the duration of the output pulse.

In accordance with the present invention, a pulse duration lengthening circuit is connected in parallel with the inductively regenerative circuit of a monostable multivibrator and comprises a capacitively regenerative circuit.

In accordance with the present invention, a monostable multivibrator for producing a pulse comprises an input transistor having emitter, collector and base electrodes, and output transistor having emitter, collector and base electrodes and connecting circuitry connecting the collector electrode of the input transistor to the base elecrode of the output transistor. An inductively regenerative circuit couples the collector electrode of the output transistor to the base electrode of the input transistor for determining the duration of the pulse produced by the monostable multivibrator. A voltage source has one polarity terminal connected to the emitter electrodes of the input and output transistors and the other polarity terminal coupled to the collector electrodes of the input and output transistors. A pulse duration lengthening circuit is connected between the base electrode of the input transistor and the collector electrode of the output transistor for lengthening the duration of the pulse produced by the monostable multivibrator. The pulse duration lengthening circuit comprises a potentiometer connected between the collector electrode of the output transistor and the other polarity terminal of the voltage source, the potentiometer having a tap point, a pair of diodes connected in series between the base electrode of the input transistor and the one polarity terminal of the voltage source and has a common connection point between the diodes, the diodes being connected in their conductive direction, and a capacitor coupled between the tap point of the potentiometer and the common connection point of the diodes.

In accordance with the present invention, a plurality of capacitively regenerative circuits may be connected in parallel with each other and connected to the monostable multivibrator circuit. This permits additional influencing factors to affect the length of the pulse duration.

In order that the present invention may be readily carried into effect, it will now be described with reference to the accompanying drawings, wherein.

In the figures, the same components are identified by the same reference numerals.

Figure 1:
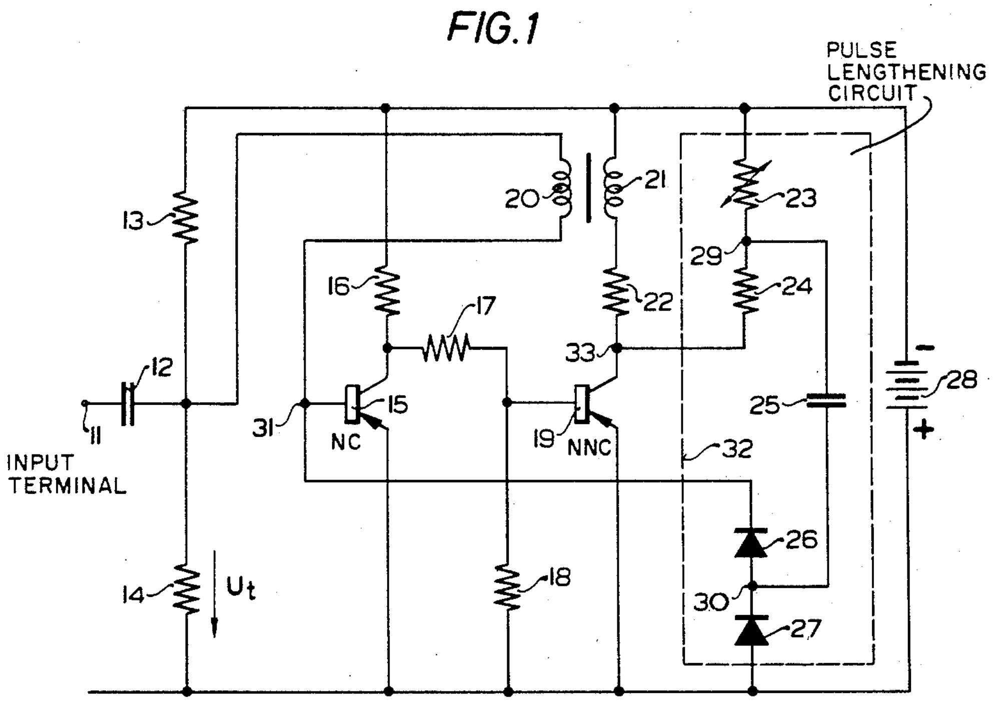
FIG. 1 is a circuit diagram of an embodiment of the inductively regenerative monostable multivibrator of the present invention.

In FIG. 1, all the components, with the exception of the components 23, 24, 25, 26 and 27 of the pulse duration lengthening circuit 32, function in a known manner as transformer-coupled monostable multivibrator. The monostable multivibrator comprises an input transistor 15 and an output transistor 19. Resistors 16, 17, 18 and 22 are utilized in a known manner for a quantitative determination of the potential and current conditions at the transistor switching elements with which they are associated.

In the stable condition of the monostable multivibrator, the transistor 15 is conductive and the transistor 19 is nonconductive. If a positive potential pulse from input terminal 11 is applied to the base of the transistor 15 via coupling capacitor 12 and secondary winding 20 of the regenerative circuit transformer, the multivibrator is switched to its unstable condition, in which said input transistor 15 is nonconductive and the output transistor 19 is conductive. The collector current of the transistor 19 exponentially rises in the primary winding 21 of the regenerative circuit transformer and induced in the secondary winding 20 of said transformer a potential increase having a magnitude $AU_1$, which diminishes or fades out exponentially.

Figure 2:
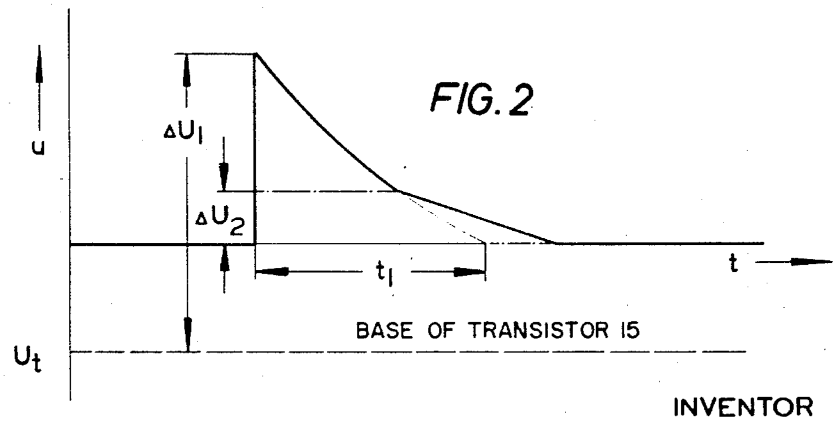
FIG. 2 is a graphical presentation of the base potential of the input transistor 15 of FIG. 1.

In FIG. 2, the abscissa represents time and the ordinate represents the potential at the base of the transistor 15, relative to the positive potential of the battery 28 of FIG. 1. The potential at the base of the transistor 15 results from the overlapping of the partial potential $U_t$ applied to resistor 14 and the exponentially decreasing secondary voltage of the regenerative circuit transformer. If the pulse duration lengthening circuit 32 of the present invention were not included in the circuit of FIG. 1, at the base of the transistor 15 would decrease to zero after a time period $t_1$. When its base potential reaches zero, the transistor 15 again becomes conductive and the multivibrator is switched back to its stable condition.

The pulse duration lengthening circuit 32 comprises a potentiometer 23, 24 having a variable resistor 23 and a resistor 24 connected in series with the emitter-collector path of the transistor 19 across the voltage source or battery 28. The pulse duration lengthening circuit 32 also comprises a path of diodes 26 and 27 connected in series between the positive polarity terminal of the voltage source 28 and the base of the transistor 15, and a capacitor 25 connected between the tap point 29 of the potentiometer 23, 24 and the common connection point 30 of the diodes 26 and 27.

The pulse duration lengthening circuit 32 functions as a capacitively regenerative circuit. When the monostable multivibrator is in its stable condition, the tap point 29 of the potentiometer 23, 24 is at the negative potential and the common connection point 30 is at the positive potential of the voltage source 28. When the transistor 19 becomes conductive, the potential at the collector of said transistor increases by the magnitude of voltage source 28 in a positive direction and the potential at the tap point 29 increases in accordance with the dividing ratio of the potentiometer 23, 24 only by the amount $AU_2$. The potential at the common connection point 30 also increases by the same amount in the positive direction.

However, since the potential increase $AU_1$ is greater than the potential increase $AU_2$, both diodes 26 and 27 are initially blocked, so that the capacitor 25 cannot discharge. When the base potential of the transistor 15 reaches the magnitude $AU_2$ during the decrease of the secondary potential, the diode 26 becomes conductive and the capacitance 25 discharges through the diode 26, the secondary winding 20 and the potentiometer 13, 14. The discharge of the capacitor 25 overlaps the decrease of the secondary potential and slows down the change of the base potential of the transistor 15 in the negative direction from the instant that the diode 26 becomes conductive.

The pulse duration lengthening circuit 32 thus lengthens the duration of the pulse of the monostable multivibrator. The lengthening of the pulse duration depends upon the discharge time of the capacitor and the magnitude $AU_2$ of the potential increase. The magnitude of the potential increase $AU_2$ may be controlled by 23, 24. The variation of the potentiometer 23, 24 is facilitated by the variable resistor 23 thereof. When the monostable multivibrator is switched to its stable condition, the capacitor 25 is charged by the voltage source 28 through the diode 27.

Figure 3:
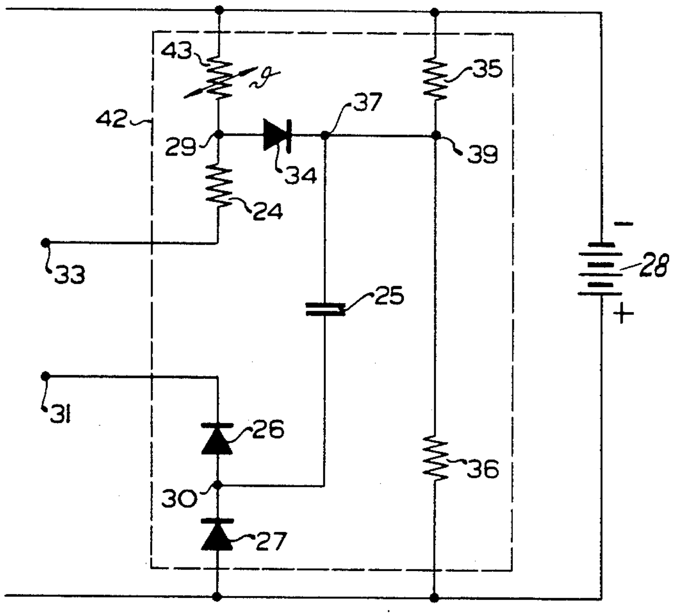
FIG. 3 is a circuit diagram of a modification of the pulse duration lengthening circuit of FIG. 1.

FIG. 3 is a modification of the pulse duration lengthening circuit of FIG. 1. The pulse duration lengthening circuit 42 of FIG. 3 is connected to the same circuit points 31 and 33 and to the same voltage source 28 as is the pulse duration lengthening circuit 32 of FIG. 1. In the pulse duration lengthening circuit 42, the diodes 26 and 27 are as utilized in the pulse duration lengthening circuit 32 of FIG. 1. The variable resistor 23 of the potentiometer 23, 24 of the circuit 32 is replaced by a temperature-responsive resistor 43 in the circuit 42 of FIG. 2.

In the pulse duration lengthening circuit 42, the capacitor is connected between the common connection point 30 and the tap point 29 of the potentiometer 43, 24 via a diode 34 connected to said tap point. A potentiometer 35, 36 is connected across the voltage source 28, and the capacitor 25 is connected between the common connection point 30 and the tap point 39 of the potentiometer 35, 36. The monostable multivibrator including the pulse duration lengthening circuit 42 functions to control the warmup of an electronically-controlled suction-type gasoline injection engine. The duration of the monostable multivibrator pulse increases, below a predetermined reference temperature, with the decreasing temperature.

The temperature-responsive resistor 43 has a negative temperature coefficient and is positioned at a suitable place in the cooling-water circulation system of the engine. In order to effectuate the pulse duration dependence upon the temperature only at temperatures lower than the predetermined reference temperature, the capacitor 25 is connected to the tap point 29 of the potentiometer 43, 24 via the diode 34 which is connected in its blocking direction, and to the tap point 39 of the potentiometer 35, 36 which comprises the two high resistance resistors 35 and 36.

The dividing ratio of the potentiometer 35, 36 is such, that when the transistor 19 is conductive at the predetermined reference temperature, the tap points 29 and 37 are at substantially the same potential and the diode 34 is just about blocked. If the temperature is lower than the predetermined reference temperature, the potential at the tap point 29 increases so much in the positive direction, due to the higher resistance value of the temperature-responsive resistor 43, that the diode 34 becomes conductive. The internal resistance of the potentiometer 35, 36 is considerably higher than that of the potentiometer 43, 24, so that there is a positive potential increase at the tap point 37. The positive potential increase at the tap point 37 causes the discharge of the capacitor 25 through the diode 26, the secondary winding 20 and the potentiometer 13, 14 and slows down the charge of the base potential of the transistor 15 in the negative direction, as when the capacitor 25 of the pulse duration lengthening circuit of FIG. 1 discharges. The slowing down of the charge of the base potential of the transistor 15 increases the duration of the multivibrator pulse as the temperature decreases.

In its application to a suction-type gasoline injection engine, it is necessary to lengthen the duration of the pulse of the monostable multivibrator in dependence upon the operating voltage. Since the electromagnetically operated injection valves have activating delays which increase with decreasing operating voltage, it is necessary for compensation of this effect that the duration of the pulse of the multivibrator increase or lengthen as the operating voltage decreases.

Figure 4:
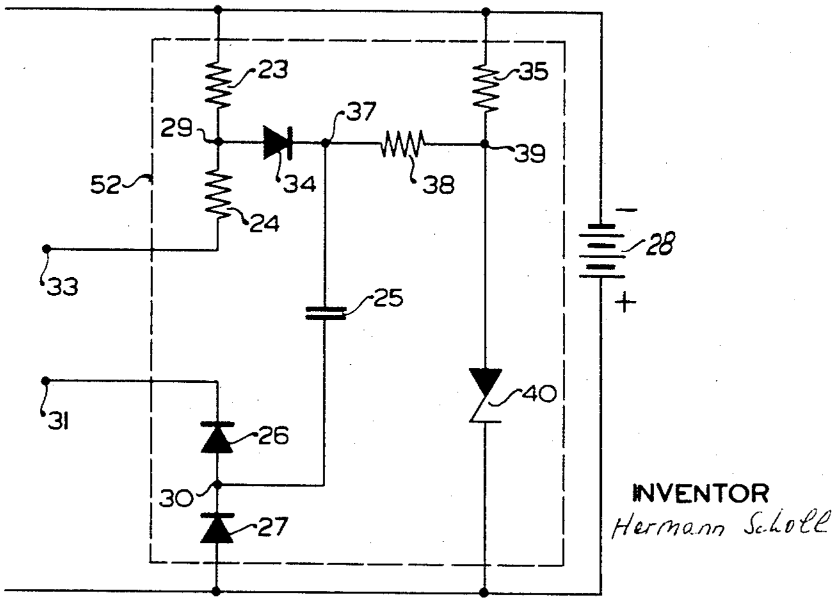
FIG. 4 is a circuit diagram of another modification of the pulse duration lengthening circuit of FIG. 1.

FIG. 4 is another modification of the pulse duration lengthening circuit of FIG. 1. The pulse duration lengthening circuit 52 of FIG. 4 is connected to the same circuit points 31 and 33 and to the same voltage source 28 as is the pulse duration lengthening circuit 32 of FIG. 1 and the pulse duration lengthening circuit 42 of FIG. 3. The pulse duration lengthening circuit 52 of FIG. 4 is the same as the pulse duration lengthening circuit 42 of FIG. 3, with the exception that a resistor 38 is connected between the top point 39 and the circuit point 37 and the resistor 36 of the potentiometer 35, 36 is replaced by a Zener diode 40.

The Zener potential of the Zener diode 40 is lower than the lowest operating voltage of the voltage source or battery 28. The dividing ratio of the potentiometer 23, 24 is so calculated that when the transistor 19 is conductive, at the maximum operating voltage, tap point 29 and the circuit point 37 are at substantially the same potential and the diode 34 is just about blocked.

If the operating potential decreases in magnitude, then the magnitude of the positive potential increase at the tap point 29 when the multivibrator switches its condition, decreases. However, the simultaneous increase in potential relative to the positive potential of the voltage source 28 varies further in the positive direction. Since the potential at the Zener diode 40 does not change, the diode 34 then becomes conductive when the transistor 19 becomes conductive. If the resistance of the resistor 38 is high relative to the internal resistance of the potentiometer 23, 24, there is a positive potential increase at the circuit point 37 which in the aforediscussed manner, causes the discharge of the capacitor 25 through the diode 26, the secondary winding 20 and the potentiometer 13 and 14 and slows down the charge of the base potential of the transistor 15 in the negative direction. The slowing down of the charge of the base potential of the transistor 15 increases or lengthens the duration of the multivibrator pulse as the operating voltage of the voltage source or battery 28 decreases.

The lengthening of the duration of the pulse of the multivibrator accomplished by the pulse duration lengthening circuits 32, 42 and 52 of FIGS. 1, 3 and 4, may be accomplished simultaneously if said pulse duration lengthening circuits are connected in parallel with the circuit points 31 and 33. A mutual effect does not occur as long as the increases in length of the pulse duration are small relative to the basic pulse duration. This is due to the fact that the diode 26 functions simultaneously as a decoupler.

While the invention has been described by means of a specific example and in specific embodiments, I do not wish to be limited thereto, for obvious modifications will occur to those skilled in the art without departing from the spirit and scope of the invention.

What I claim is:

1. A monostable multivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said output transistor and the other polarity terminal of said voltage source, said potentiometer means having a tap point, a pair of diodes connected in series between the base electrode of said input transistor and the one polarity terminal of said voltage source and having a common connection point between said diodes, said diodes being connected in their conductive direction, and a capacitor coupled between the tap point of said potentiometer means and the common connection point of said diodes.

2. A monostable multivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said output transistor and the other polarity terminal of said voltage source, said potentiometer means comprising a variable resistor and a resistor connected in series and having a tap point between said variable resistor and said resistor, a pair of diodes connected in series between the base electrode of said input transistor and the one polarity terminal of said voltage source and having a common connection point between said diodes, said diodes being connected in their conductive direction, and a capacitor coupled between the tap point of said potentiometer means and the common connection point of said diodes.

3. A monostable multivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said output transistor and the other polarity terminal of said voltage source, said potentiometer means comprising a temperature-responsive resistor and a resistor connected in series and having a tap point between said temperature-responsive resistor and said resistor, a pair of diodes connected in series between the base electrode of said input transistor and the one polarity terminal of said voltage source and having a common connection point between said diodes, said diodes being connected in their conductive direction, and a capacitor coupled between the tap point of said potentiometer means and the common connection point of said diodes.

4. A monostable multivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said output transistor and the other polarity terminal of said voltage source, said potentiometer means comprising a variable resistor and a voltage-responsive resistor connected in series with said variable resistor and having a tap point between said variable resistor and said voltage-responsive resistor, a pair of diodes connected in series between the base electrode of said input transistor and the one polarity terminal of said voltage source and having a common connection point between said diodes, said diodes, being connected in their conductive direction, and a capacitor coupled between the tap point of said potentiometer means and the common connection point of said diodes.

5. A monostable multivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said transistor and the other polarity terminal of said voltage source, said potentiometer means having a tap point, a pair of diodes connected in series between the base electrode of said input transistor and the one polarity terminal of said voltage source and having a common connection point between said diodes, said diodes being connected in their conductive direction, further potentiometer means connected between the terminals of said voltage source and having a tap point, a diode connected in its blocking direction between the tap points of said potentiometer means and said further potentiometer means, and a capacitor connected to a common point between said diode and the tap point of said further potentiometer means and the common connection point of said diodes.

6. A monostable mutlivibrator for producing a pulse, comprising:

an input transistor having emitter, collector and base electrodes;

an output transistor having emitter, collector and base electrodes;

means connecting the collector electrode of said input transistor to the base electrode of said output transistor;

inductively regenerative means coupling the collector electrode of said output transistor to the base electrode of said input transistor for determining the duration of the pulse produced by said monostable multivibrator;

a voltage source having one polarity terminal connected to the emitter electrodes of said input and output transistors and the other polarity terminal coupled to the collector electrodes of said input and output transistors; and a pulse duration lengthening circuit connected between the base electrode of said input transistor and the collector electrode of said output transistor for lengthening the duration of the pulse produced by said monostable multivibrator, said pulse duration lengthening circuit comprising potentiometer means connected between the collector electrode of said output transistor and the other polarity terminal of said voltage source, said potentiometer means comprising a temperature-responsive resistor and a resistor connected in series and having a tap point between said temperature-responsive resistor and said resistor, a pair of diodes connected in series between the base electrode of said input transistor and the one polarity terminal of said voltage source and having a common connection point between said diodes, said diodes being connected in their conductive direction, further potentiometer means connected between the terminals of said voltage source and having a tap point, a diode connected in its blocking direction between the tap points of said potentiometer means and said further potentiometer means, and a capacitor connected to a common point between said diode and the tap point of said further potentiometer means and the common connection point of said diodes.

7. A monostable multivibrator as claimed in claim 6, wherein the further potentiometer means of said pulse duration lengthening circuit comprises a Zener diode and a high resistance resistor connected in series with said Zener diode and having a tap point between said Zener diode and said high resistance resistor.

8. A monostable multivibrator as claimed in claim 7, wherein said Zener diode has a Zener potential which is lower than the lowest operating voltage of said voltage source and further comprising a resistor connected in series with said diode between the tap points of said potentiometer means and said further potentiometer means, said resistor being connected to the tap point of said further potentiometer means and said capacitor being connected to a common point between said diode and said resistor.

References Cited

UNITED STATES PATENTS

| | | | |
|---|---|---|---|
| 3,073,422 | 1/1963 | Baumann | 307—273 |
| 3,193,706 | 7/1965 | Creamer et al. | 307—273 |

JOHN S. HEYMAN, *Primary Examiner.*

U.S. Cl. X.R.

307—267, 282